(12) United States Patent
Hornegger et al.

(10) Patent No.: US 7,280,686 B2
(45) Date of Patent: Oct. 9, 2007

(54) COMPUTER-SUPPORTED IMAGE RECONSTRUCTION METHOD FOR A THREE-DIMENSIONAL SUBJECT

(75) Inventors: Joachim Hornegger, Baiersdorf (DE); Joachim Reiss, Baiersdorf (DE); Christoph Schnoerr, Ladenburg (DE)

(73) Assignee: Siemens Aktiengesellschaft, Munich (DE)

( * ) Notice: Subject to any disclaimer, the term of this patent is extended or adjusted under 35 U.S.C. 154(b) by 859 days.

(21) Appl. No.: 10/447,599

(22) Filed: May 29, 2003

(65) Prior Publication Data

US 2004/0008882 A1    Jan. 15, 2004

(30) Foreign Application Priority Data

May 29, 2002    (DE) ................ 102 24 011

(51) Int. Cl.
*G06K 9/00* (2006.01)

(52) U.S. Cl. ............... 382/154; 345/419; 345/664; 382/131; 382/285; 600/424; 600/428; 600/431

(58) Field of Classification Search ............... 345/419, 345/424, 664; 378/8, 15, 202, 205, 206; 382/131, 154, 285; 600/424, 428, 431
See application file for complete search history.

(56) References Cited

U.S. PATENT DOCUMENTS

| | | | | |
|---|---|---|---|---|
| 5,381,518 A * | 1/1995 | Drebin et al. | ................ | 345/424 |
| 5,734,384 A * | 3/1998 | Yanof et al. | ................ | 345/424 |
| 6,139,183 A * | 10/2000 | Graumann | ................ | 378/206 |
| 6,206,566 B1 * | 3/2001 | Schuetz | ................ | 378/205 |
| 6,236,704 B1 * | 5/2001 | Navab et al. | ................ | 378/4 |
| 6,282,256 B1 * | 8/2001 | Grass et al. | ................ | 378/15 |
| 6,317,621 B1 * | 11/2001 | Graumann et al. | ......... | 600/424 |
| 6,324,254 B1 * | 11/2001 | Pflaum | ................ | 378/95 |
| 6,351,513 B1 * | 2/2002 | Bani-Hashemi et al. | ....... | 378/8 |
| 6,370,417 B1 * | 4/2002 | Horbaschek et al. | ......... | 600/424 |
| 6,379,041 B1 * | 4/2002 | Schuetz et al. | ............. | 378/205 |
| 6,389,104 B1 * | 5/2002 | Bani-Hashemi et al. | . | 378/98.12 |
| 6,442,235 B2 * | 8/2002 | Koppe et al. | ................ | 378/62 |
| 6,461,039 B1 * | 10/2002 | Klotz et al. | ................ | 378/197 |
| 6,470,207 B1 * | 10/2002 | Simon et al. | ................ | 600/426 |
| 6,491,429 B1 * | 12/2002 | Suhm | ................ | 378/205 |
| 6,491,430 B1 * | 12/2002 | Seissler | ................ | 378/207 |
| 6,496,558 B2 * | 12/2002 | Graumann | ................ | 378/39 |
| 6,533,455 B2 * | 3/2003 | Graumann et al. | ......... | 378/205 |
| 6,574,500 B2 * | 6/2003 | Keren | ................ | 600/431 |
| 6,606,091 B2 * | 8/2003 | Liang et al. | ................ | 345/424 |
| 6,640,127 B1 * | 10/2003 | Kosaka et al. | ............. | 600/426 |

(Continued)

OTHER PUBLICATIONS

Reducing The Fan-Beam Scanning Angular Range, Tarn, Phys. Med. Biol., vol. 33, No. 8 (1988), pp. 955-967.

*Primary Examiner*—Gregory M Desire
(74) *Attorney, Agent, or Firm*—Schiff Hardin LLP

(57) ABSTRACT

A computer is supplied with at least three 2-D projections of a subject that are offset from one another by difference angles. A position in the projection surface and a respective surface data value per projection are allocated to the respective surface elements of the projection surface. On the basis of the supplied projections, the computer determines binary volume data values for a number of volume elements, a position in space being allocated to the volume elements, so that their totality represents a 3-D image of the subject.

45 Claims, 3 Drawing Sheets

U.S. PATENT DOCUMENTS

| | | | |
|---|---|---|---|
| 6,795,571 B2 * | 9/2004 | Kusch | 382/131 |
| 6,850,587 B1 * | 2/2005 | Karimi et al. | 378/15 |
| 6,895,268 B1 * | 5/2005 | Rahn et al. | 600/429 |
| 6,909,769 B2 * | 6/2005 | Bruder et al. | 378/8 |
| 7,050,531 B2 * | 5/2006 | Hebecker et al. | 378/8 |
| 7,148,903 B2 * | 12/2006 | Brunner et al. | 345/626 |
| 2004/0008882 A1 * | 1/2004 | Hornegger et al. | 382/154 |
| 2004/0215071 A1 * | 10/2004 | Frank et al. | 600/407 |

* cited by examiner

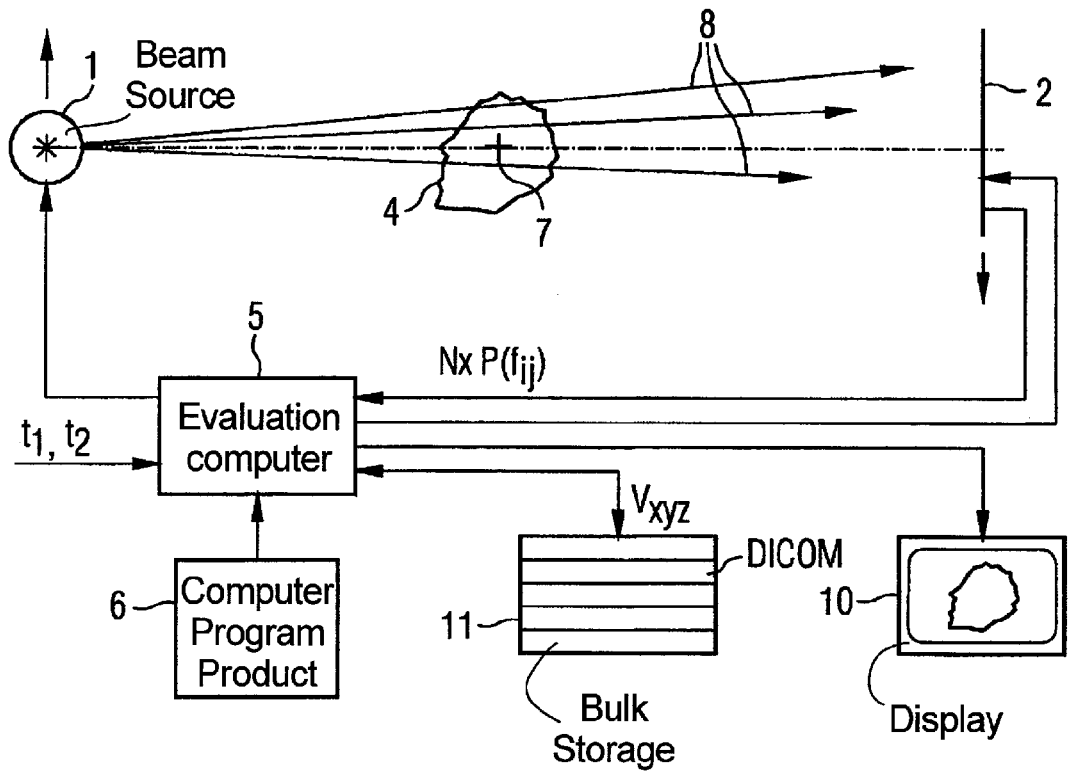
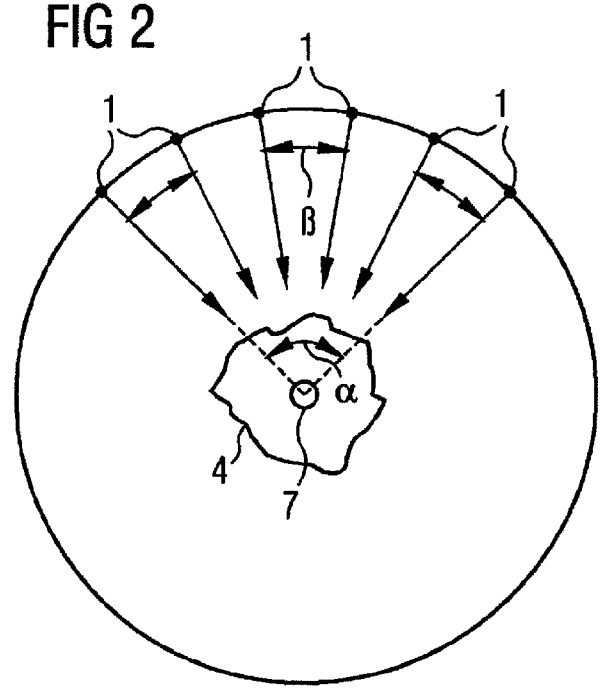

COMPUTER-SUPPORTED IMAGE RECONSTRUCTION METHOD FOR A THREE-DIMENSIONAL SUBJECT

BACKGROUND OF THE INVENTION

1. Field of the Invention

The present invention is directed to a computer-supported method for reconstructing an image of a three-dimensional subject, of the type wherein at least three two-dimensional projections of the subject, onto a projection surface composed of surface elements, that are offset from one another by difference angles are supplied to an evaluation computer, the difference angles being in a common rotational plane, the position in the projection surface and—per projection—a surface data value are respectively allocated to the surface elements, and volume data values for a number of volume elements to which respective positions in space are allocated are determined by the evaluation computer on the basis of the supplied, two-dimensional projections, so that the totality of volume elements represent a three-dimensional image of the subject.

2. Description of the Prior Art

Such methods are well known for C-arm X-ray systems. In such a system, the beam source and the projection surface are rotated synchronously and in the same direction through at least 180° and 44 through 400 X-ray exposures are thereby acquired. The reconstruction then ensues by means of the Feldkamp back-projection algorithm.

A rotation through by at least 180° is compulsory in the Feldkamp back-projection algorithm. The C-arm X-ray system that enables such a rotation through 180° and more, however, are relatively costly. There are therefore a number of systems wherein only rotation by an angle smaller than 180° is possible. A 3D reconstruction of the subject cannot ensue in such systems operating conventionally.

SUMMARY OF THE INVENTION

An object of the invention is to provide a computer-supported reconstruction method that enables a 3D reconstruction of the subject for a number of applications even when the beam source and the projection surface are rotated by an angle smaller than 180°.

This object is achieved by employing the volume data values that are binary.

Employing binary volume data values in fact represents an approximation, but the approximation is acceptable since high-contrast subjects are examined in many applications. In angiography, for example, the vessels of interest are filled with a contrast agent, or bones themselves already represent such high-contrast subjects.

The inventive reconstruction method, of course, can also be applied when a rotation by 180° or more ensues, but rotation by 180° or more is no longer compulsory. The sum of the difference angles thus also can be less than 180°. In particular, it is possible that it only amounts to 60 to 120°.

The projections preferably are uniformly distributed within the range of rotation with reference to the rotational axis. They can be parallel projections. Preferably, however, they are perspective projections.

Due to the simplified reconstruction method, it is now possible for the number of projections to be less than 40, particularly less than 20, for example less than 10. As a result of the inventive reconstruction method, it is possible to subject a patient to a notably lower radiation stress than in conventional reconstruction methods.

The volume data values represent a basic transparency and a minimum transparency of the subject. It is possible for the basic transparency and/or the minimum transparency to be determined by the evaluation computer together with the volume data values. Alternatively, of course, it is also possible to prescribe the basic transparency and/or the minimum transparency for the evaluation computer.

When the identified volume data values are stored in a bulk storage by the evaluation computer such that the volume data values of volume elements whose positions in space lie in a common plane are stored together, then an especially simple access to individual slices of the volume is achieved.

When the identified volume data values are stored in a bulk storage in DICOM format by the evaluation computer, the a widespread memory format is employed.

Due to the fact that the volume data values can assume only two different values, it is possible to first determine those volume data values that are sure to represent the basic transparency of the subject and to subsequently determine which values the remaining volume data values in fact assume, by testing the remaining possibilities (trial and error). It is simpler and faster, however, to use a method of discrete tomography for the determination of the volume data values.

DESCRIPTION OF THE DRAWINGS

FIG. 1 schematically illustrates an imaging medical system operable in accordance with the inventive method.

FIG. 2 is a plan view onto a rotation plane of the system of FIG. 1.

DESCRIPTION OF THE PREFERRED EMBODIMENTS

Figure 3:
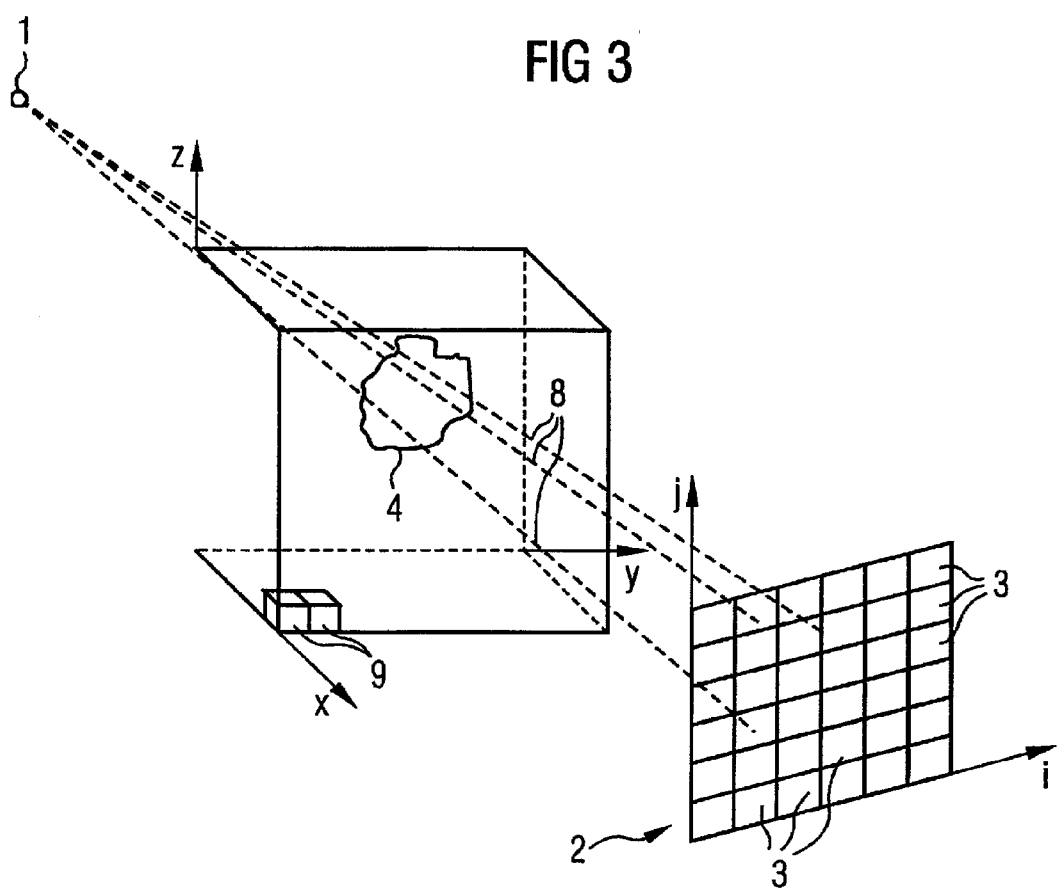
FIG. 3 is an explanatory illustration of a projection for explaining the invention.

As shown in FIG. 1, an imaging medical system, for example an X-ray system, has a beam source 1 (an X-ray tube 1 here ) and a projection surface 2. The projection surface 2 has gas shown in FIG. 3, a number of surface elements. A three-dimensional subject 4 to be examined and that can be transirradiated with the beam source 1 is arranged between the radiation source 1 and the projection surface 2.

The imaging medical system further has a control and evaluation computer 5 that is connected to the beam source 1 and to the projection surface 2 in terms of control and data. The control and evaluation computer 5 is programmed with a computer program product 6 that determines the behavior of the control and evaluation computer 5. As a result of the programming with the computer program product 6, the control and evaluation computer 5 implements a reconstruction method for the subject 4 that is described in greater detail below.

The beam source 1 and the projection surface 2, as indicated by oppositely directed arrows at the beam source 1 and the projection surface 2 in FIG. 1, are rotated synchronously and in the same direction with respect to a common rotational axis 7 by the control and evaluation computer 5, by a rotational angle α. The rotation thus ensues in a rotational plane. The beam source 1 is operated either continuously or pulsed during the swivel by the rotational angle α. The projection surface 2 is thereby struck by radiation from the beam source 1, some of which has transirradiated the subject 4. Two-dimensional projections P of the subject determined in this way are supplied to the control and evaluation computer 5. The projections P are offset relative to one another by difference angles β. The sum of the difference angles β thereby yields the rotational angle α.

As can be seen from FIG. 2, the rotational angle α is smaller than 180°. According to the exemplary embodiment, it only amounts to 90°, and particularly is between 60° and 120°. Within the rotational angle α, the difference angle β between the individual projections is always the same according to the exemplary embodiment. The difference angles β thus are equal to one another and smaller than 90°, but, they can also vary. Only the positions of the beam source 1 during the individual projections P are shown in FIG. 2. For clarity, the positions of the projection surface 2 are not shown in FIG. 2.

As shown in FIG. 2, the number N of projections P amounts to six, but it can be more than or less than six. The number n amounts to at least three. Upwardly, the number N is basically arbitrary. In order to keep the radiation stress on the subject 4 minimal, however, it should be less than 40, particularly less than 20, for example less than 10.

As can be seen especially clearly from FIG. 3, the beam source 1 can be assumed to be essentially punctiform. The projections P are thus perspective projections.

As shown in FIG. 3, the surface elements 3 are two-dimensionally distributed in the projection surface 2. A position ij in the projection surface 2 is allocated to each surface element 3. Per projection, moreover, each surface element 3 supplies a surface data value fij. The surface data value fij is dependent on the attenuation of projection beams 8 by the subject 4. The surface data value fij therefore can be between a minimum value and a maximum value.

It is assumed, the subject 4 is a high-contrast subject 4. For example, the subject 4 represents a vascular system filled with a contrast agent that is to be detected in an angiography procedure. Alternatively, the subject 4 can be composed of bone and the tissue surrounding the bones or bones. Each location of the high-contrast subject 4 therefore exhibits either a basic transparency t1 or a minimum transparency t2 dependent on whether the respective location lies in the highly absorbent or in the weakly absorbent region of the subject 4.

The subject is described by a number of volume elements 9 to each having a respective position xyz in space and volume data value $v_{xyz}$ are allocated. The volume data values $v_{xyz}$ are binary. When they assume the value zero, the corresponding volume elements 9 represent locations of the subject 4 that exhibit the basic transparency $t_1$. When they assume the value one, they represent location of the subject 4 that exhibit the minimum transparency $t_2$.

On the basis of the supplied, two-dimensional projections P, the volume data values $v_{xyz}$ for all volume elements 9 are determined by the control and evaluation computer 5 such that the totality of volume elements 9 represents a three-dimensional image of the subject 4.

The determination of the volume data values $v_{xyz}$ can ensue by determining at least the volume data values $v_{xyz}$ of those volume elements 9 that definitely exhibit the basic transparency t1. This will generally be the overwhelming portion of the volume elements 9. Due to the fact that the remaining volume elements 9 are thus already considerably reduced numerically and the volume data values vxyz are binary, i.e. can assume only two values, it is then possible with reasonable computing outlay to determine the volume data values vxyz of the remaining volume elements 9 by trial and error.

It is faster and more dependable, however, to determine the volume data values $v_{xyz}$ by means of a method of discrete tomography. Such methods are known, for example, from Kuba, Herman, Discrete Tomography, Birkhäuser Verlag 1999, and also can be applied without further ado in the present case.

It is possible to prescribe the basic transparency $t_1$ and/or the minimum transparency $t_2$ for the control and evaluation computer 5 either directly or indirectly. For example, a user can indicate what contrast agent is being employed in the angiography, so that the control and evaluation computer 5 can determine the corresponding transparencies $t_1$, $t_2$ on the basis of a table stored internally in the computer. Particularly in the application of the method of discrete tomography, it is alternatively possible for the control and evaluation computer 5 to itself determine the transparencies $t_1$, $t_2$ together with the volume data values $v_{xyz}$.

After the determination of the volume data values $v_{xyz}$, corresponding presentations of the subject 4 can be displayed on a viewing device 10. The determination of the presentations can thereby ensue in a known way, for example by means of the well-known volume rendering method. Alternatively or additionally, the volume data values $v_{xyz}$ can be stored in a bulk storage 11. The storage can ensue in arbitrary formats, but it preferably ensues in the DICOM format.

The volume data values $v_{xyz}$ preferably are stored in the bulk storage 11 so that the volume data values $v_{xyz}$ of volume elements 9 whose positions xyz in space lie in a common plane are stored together. This is indicated in FIG. 1 by the layered division of the bulk storage 11.

Figure 4:
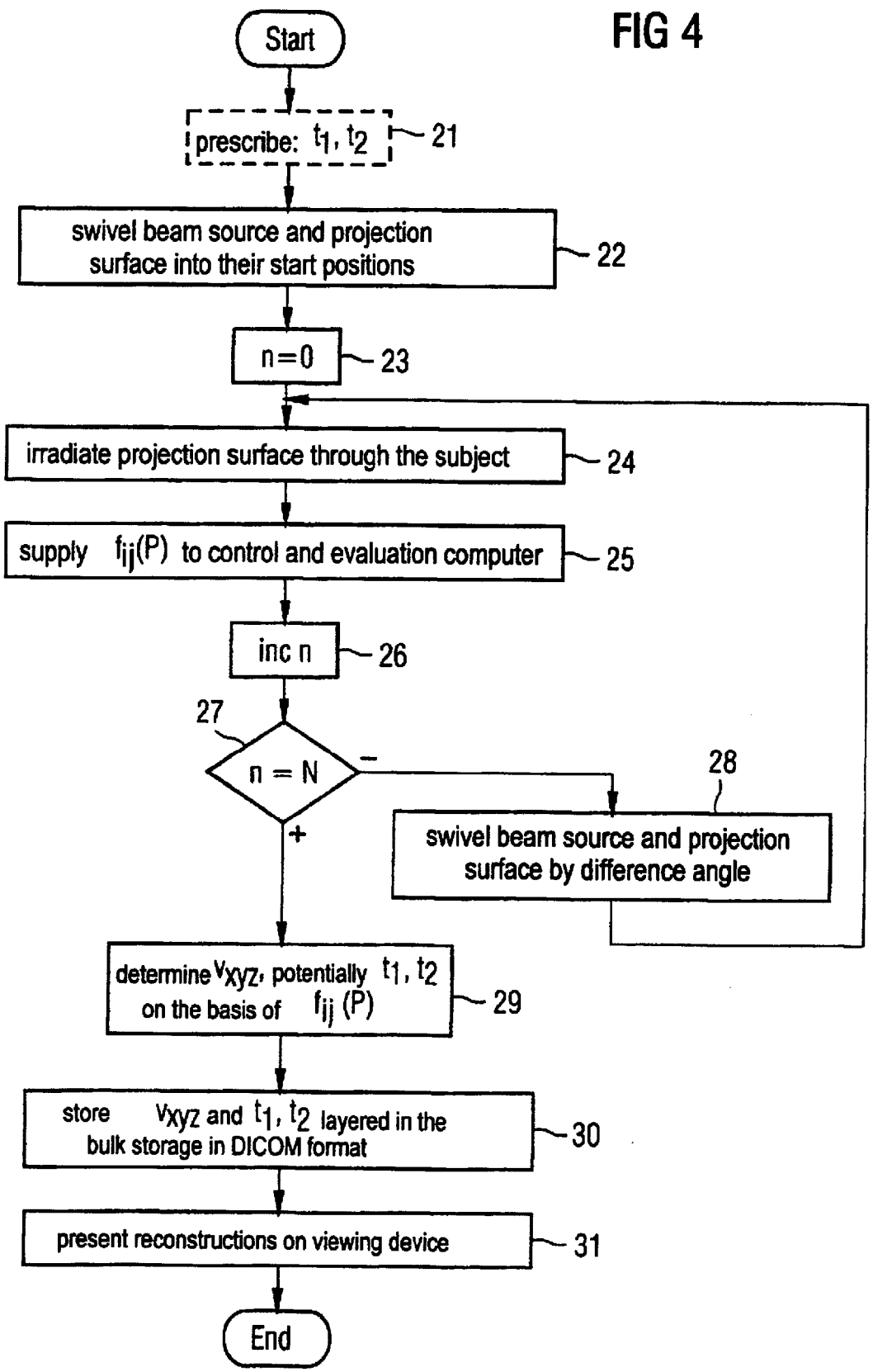
FIG. 4 is a flowchart of the inventive method.

The inventive procedure shall be explained again based on FIG. 4.

As indicated with broken lines in FIG. 4, a basic transparency t1 and a minimum transparency t2 can be initially prescribed to the control and evaluation computer 5 in a step 21. After the optional prescription of the transparencies t1, t2, the beam source 1 and the projection surface 2 are rotated into their starting positions in a step 22. An index n is set to the value zero immediately thereafter in a step 23.

The projection surface 2 is then irradiated through the subject 4 proceeding from the beam source 1 in a step 24. The projection P determined in this way is supplied to the control and evaluation computer 5 in a step 25. The index n is incremented by one in a step 26. A check to see whether the index n is greater than the plurality N is carried out in a step 27.

If the index n is not yet greater than the number N, then the beam source 1 and the projection surface 2 are rotated by the difference angle β (which is constant according to the exemplary embodiment) in a step 28. A branch is then made back to the step 24.

When, by contrast, the index n has reached the plurality N, then the control and evaluation computer 5 determines the volume data values $v_{xyz}$ on the basis of the surface data values fij of the projections P. As warranted, it also determines the transparencies $t_1$, $t_2$ in the step 29. The identified volume data values $v_{xyz}$ and the transparencies $t_1$, $t_2$ are stored in layers in the DICOM format in the bulk storage 11 in a step 30. Presentations of the reconstructed subject ensue on the viewing device 10 in a step 31.

Due to the limitation to high-contrast subjects 4, thus, three-dimensional reconstructions of the subject 4 are possible with the inventive reconstruction method even though only a very small number N of projections P was acquired and the rotational angle α is smaller than 180°.

Although modifications and changes may be suggested by those skilled in the art, it is the intention of the inventors to embody within the patent warranted hereon all changes and modifications as reasonably and properly come within the scope of their contribution to the art.

We claim as our invention:

1. A computer-supported method for reconstructing an image of a three-dimensional subject comprising the steps of:
   supplying at least three two-dimensional projections of a three-dimensional subject, onto a projection surface composed of surface elements, to an evaluation computer, said projections being offset from each other by difference angles in a rotational plane;
   in said evaluation computer, allocating to each of said surface elements a position designation designating a position of the surface element in the projection surface, and in each projection, a surface data value; and
   in said evaluation computer, allocating binary volume data values, dependent on the respective position designations and surface data values of a plurality of said surface elements, for a plurality of volume elements having respective positions in space, for generating a three-dimensional image of said subject from a totality of said volume elements.

2. A method as claimed in claim 1 wherein the step of supplying at least three two-dimensional projections to said evaluation computer comprises supplying said at least three two-dimensional projections with said difference angles being less than 90°.

3. A method as claimed in claim 1 wherein the step of supplying at least three two-dimensional projections to said evaluation computer comprises supplying said at least three two-dimensional projections with said difference angles being equal to each other.

4. A method as claimed in claim 1 wherein the step of supplying at least three two-dimensional projections to said evaluation computer comprises supplying said at least three two-dimensional projections with said difference angles being less than 180°.

5. A method as claimed in claim 1 wherein the step of supplying at least three two-dimensional projections to said evaluation computer comprises supplying said at least three two-dimensional projections with said difference angles being in range between 60° and 120°.

6. A method as claimed in claim 1 comprising supplying perspective projections to said evaluation computer as said at least three two-dimensional projections.

7. A method as claimed in claim 1 wherein the step of supplying at least three two-dimensional projections to said evaluation computer comprises supplying less than 40 two-dimensional projections to said evaluation computer.

8. A method as claimed in claim 1 wherein the step of supplying at least three two-dimensional projections to said evaluation computer comprises supplying less than 20 two-dimensional projections to said evaluation computer.

9. A method as claimed in claim 1 wherein the step of supplying at least three two-dimensional projections to said evaluation computer comprises supplying less than 10 two-dimensional projections to said evaluation computer.

10. A method as claimed in claim 1 comprising:
    in said evaluation computer, determining at least one of a basic transparency of said subject and a minimum transparency of said subject; and
    generating said volume data values in said evaluation computer to represent said at least one of said basic transparency and said minimum transparency.

11. A method as claimed in claim 1 comprising:
    supplying to said evaluation computer at least one of a basic transparency of said subject and a minimum transparency of said subject; and
    generating said volume data values in said evaluation computer to represent said at least one of said basic transparency and said minimum transparency.

12. A method as claimed in claim 1 comprising storing said volume data values in a bulk storage accessible by said evaluation computer, with volume data values for volume elements respectively having positions in space in a same plane being stored together in said bulk storage.

13. A method as claimed in claim 12 comprising storing said volume data values in DICOM format in said bulk storage.

14. A method as claimed in claim 1 comprising generating said volume data values using a discrete tomography method.

15. A method as claimed in claim 1 wherein the step of generating said three-dimensional image comprises generating a three-dimensional angiographic image of said subject.

16. A method as claimed in claim 1 wherein the step of generating said three-dimensional image comprises reconstructing a three-dimensional image of said subject composed of bone and surrounding tissue.

17. A computer-readable medium encoded with a data structure, said medium being loadable into an evaluation computer for reconstructing an image of a three-dimensional subject, said evaluation computer being supplied with at least three two-dimensional projections of a three-dimensional subject, onto a projection surface composed of surface elements, said projections being offset from each other by difference angles in a rotational plane, said computer program causing said evaluation computer to:
    allocate, to each of said surface elements, a position designation designating a position of the surface element in the projection surface, and in each projection, a surface data value; and
    allocate binary volume data values, dependent on the respective position designations and surface data values of a plurality of said surface elements, for a plurality of volume elements having respective positions in space, and to generate a three-dimensional image of said subject from a totality of said volume elements.

18. A computer-readable medium encoded with a data structure as claimed in claim 17 which allows said evaluation computer to use, as said at least three two-dimensional projections, at least three two-dimensional projections with said difference angles being less than 90°.

19. A computer-readable medium encoded with a data structure as claimed in claim 17 which allows said evaluation computer to use, as said at least three two-dimensional projections, at least three two-dimensional projections with said difference angles being equal to each other.

20. A computer-readable medium encoded with a data structure as claimed in claim 17 which allows said evaluation computer to use, as said at least three two-dimensional projections, at least three two-dimensional projections with said difference angles being less than 180°.

21. A computer-readable medium encoded with a data structure as claimed in claim 17 which allows said evaluation computer to use, as said at least three two-dimensional projections, at least three two-dimensional projections with said difference angles being in range between 60° and 120°.

22. A computer-readable medium encoded with a data structure as claimed in claim 17 which allows said evaluation computer to use perspective projections as said at least three two-dimensional projections.

23. A computer-readable medium encoded with a data structure as claimed in claim 17 that allows said evaluation computer to use less than 40 of said two-dimensional projections.

24. A computer-readable medium encoded with a data structure as claimed in claim 17 which allows said evaluation computer to use less than 20 two-dimensional projections to said evaluation computer.

25. A computer-readable medium encoded with a data structure as claimed in claim 17 which allows said evaluation computer to use less than 10 two-dimensional projections to said evaluation computer.

26. A computer-readable medium encoded with a data structure as claimed in claim 17 that causes said evaluation computer to:
    determine at least one of a basic transparency of said subject and a minimum transparency of said subject; and
    generate said volume data values to represent said at least one of said basic transparency and said minimum transparency.

27. A computer-readable medium encoded with a data structure as claimed in claim 17 which causes said evaluation computer to generate said volume data values using a discrete tomography method.

28. A computer-readable medium encoded with a data structure as claimed in claim 17 which causes said evaluation computer to generate said three-dimensional image as a three-dimensional angiographic image of said subject.

29. A computer-readable medium encoded with a data structure as claimed in claim 17 which causes said evaluation computer to generate said three-dimensional image as a reconstructed three-dimensional image of said subject composed of bone and surrounding tissue.

30. A medical imaging system for reconstructing an image of a three-dimensional subject, comprising:
    a beam source having a focus from which penetrating radiation is emitted, and a radiation detector on which said radiation is incident after penetrating a three-dimensional subject, at least said focus being rotatable around said subject in a rotational plane to produce at least three two-dimensional projections of said three-dimensional subject, onto a projection surface of said radiation detector composed of surface elements, said projections being offset from each other by difference angles in said rotational plane; and
    an evaluation computer supplied with said projections which allocates, to each of said surface elements, a position designation designating a position of the surface element in the projection surface, and in each projection, a surface data value, and which allocates, dependent on the respective position designations and surface data values of a plurality of said surface elements, binary volume data values for a plurality of volume elements having respective positions in space, and generates a three-dimensional image of said subject from a totality of said volume elements.

31. A medical imaging system as claimed in claim 30 wherein said beam source and said radiation detector produce said at least three two-dimensional projections with said difference angles being less than 90°.

32. A medical imaging system as claimed in claim 30 wherein said beam source and said radiation detector produce said at least three two-dimensional projections with said difference angles being equal to each other.

33. A medical imaging system as claimed in claim 30 wherein said beam source and said radiation detector produce said at least three two-dimensional projections with said difference angles being less than 180°.

34. A medical imaging system as claimed in claim 30 wherein said beam source and said radiation detector produce said at least three two-dimensional projections with said difference angles being in range between 60° and 120°.

35. A medical imaging system as claimed in claim 30 wherein said beam source and said radiation detector produce perspective projections as said at least three two-dimensional projections.

36. A medical imaging system as claimed in claim 30 wherein said beam source and said radiation detector produce less than 40 of said two-dimensional projections.

37. A medical imaging system as claimed in claim 30 wherein said beam source and said radiation detector produce less than 20 of said two-dimensional projections.

38. A medical imaging system as claimed in claim 30 wherein said beam source and said radiation detector produce less than 10 of said two-dimensional projections.

39. A medical imaging system as claimed in claim 30 wherein in said evaluation computer determines at least one of a basic transparency of said subject and a minimum transparency of said subject, and generates said volume data values to represent said at least one of said basic transparency and said minimum transparency.

40. A medical imaging system as claimed in claim 30 wherein said evaluation computer is supplied with at least one of a basic transparency of said subject and a minimum transparency of said subject, and generates said volume data values to represent said at least one of said basic transparency and said minimum transparency.

41. A medical imaging system as claimed in claim 30 comprising a bulk storage accessible by said evaluation computer, for storing said volume data values with volume data values for volume elements respectively having positions in space in a same plane being stored together in said bulk storage.

42. A medical imaging system as claimed in claim 41 wherein said volume data values are stored in DICOM format in said bulk storage.

43. A medical imaging system as claimed in claim 30 wherein said evaluation computer generates said volume data values using a discrete tomography method.

44. A medical imaging system as claimed in claim 30 wherein said evaluation computer generates said three-dimensional image as a three-dimensional angiographic image of said subject.

45. A medical imaging system as claimed in claim 30 wherein said evaluation computer generates said three-dimensional image as a reconstructed three-dimensional image of said subject composed of bone and surrounding tissue.

* * * * *